Patented June 24, 1930

1,766,411

UNITED STATES PATENT OFFICE

TSUNEO SUZUKI AND SUEO SAKURAI, OF TOKYO, JAPAN, ASSIGNORS TO ZAIDAN HOJIN RIKA GAKU KENKYUJO, OF TOKYO, JAPAN

FILTER FOR ABSORBING ULTRA-VIOLET LIGHT

No Drawing. Original application filed August 11, 1924, Serial No. 731,488, and in Japan December 20, 1923. Divided and this application filed January 8, 1927. Serial No. 159,994.

This invention relates to a new light filter containing salts which strongly absorb ultraviolet light, and it comprises a light filter containing the product of bringing grape sugar or inverted sugar and parasulphonic acid of phenylhydrazin into condensation. The new condensation product is named ultrazin by the inventors and as it strongly absorbs ultraviolet ray a light filter which is perfectly proof for ultraviolet ray can be very easily manufactured, so that the new products can be conveniently used to make screens for orthochromatic photography, photochronomy, colour photography and the like optical purposes.

In the following description, we will employ, for brevity of expression, the name "ultrazin", meaning the herein described new condensation product of grape sugar or invert sugar (i. e. "dextrose-containing sugar") with phenyl hydrazine para sulphonic acid, and the said name is to be so interpreted.

The new product ultrazin according to the present invention is a yellow crystalline mass of acidic reaction from which various salts can be produced. One example of the preparation will be given as follows.

10 parts of grape sugar or inverted sugar, 20 parts of para-sulphonic acid of phenylhydrazin, 20 parts of crystallyzed sodium acetate and 100 parts of water are heated at 100° C. on a hot water bath. After four hours, the solution turns dark yellow. This solution is cooled down to atmospheric temperature and 800 parts of alcohol are then poured into the said cooled solution which has been prepared as last above described. The sodium salt of the new condensation product is thereby precipitated. Similarly, when potassium acetate is used in place of sodium acetate, crystals of ultrazin potassium are precipitated.

When a water solution of basic lead acetate is poured into the water solution of said ultrazin sodium or potassium, a lemon-yellow precipitate of basic ultrazin lead is produced and as this is insoluble in water, it is easily separated out of the solution. When this product is suspended in water and hydrogen sulphide is passed, lead sulphide is precipitated. By filtering off the lead sulphide, a water solution of ultrazin is prepared. When the solution is evaporated in vacuum, a yellow crystalline mass of ultrazin is obtained. Various salts of the same can be easily prepared by neutralizing with different bases as usual.

According to the inventors' experiment, glucose (or invert sugar) and p-sulphonic acid of phenylhydrazin react each other in presence of an excess of sodium acetate, that is a solution strongly acidic by acetic acid liberated from sodium acetate by the action of the sulphonic acid, no formation of hydrazone is observed. Only the formation of coloured substance ultrazin is observed which is found to be a derivative of glucosazone, having the following composition;

0.1657 g. gave 0.0108 g. $H_2O$ --- $H_2O = 6.40\%$
0.1947 g. gave 0.0478 g. $Na_2SO_4$ --- $Na = 7.96\%$
0.1279 g. gave 10.9 c. c. wet $N_2$ at 26° C. and 761 mm. ---------------- $N = 9.43\%$ $C_{18}H_{20}O_{10}N_4S_2Na_2 \cdot 2H_2O$ requires --------------- $\begin{cases} H_2O = 6.02\% \\ Na = 7.69\% \\ N = 9.36\% \end{cases}$ The content of nitrogen will show a different value if it is a derivative of hydrazone.

Moreover, in our case, glucose and invert sugar both give the same compound; and it may also serve as a proof that this compound ultrazin is not a hydrazone derivative.

Ultrazin, or its neutral salts and especially its potassium and sodium salts easily dissolve in water. A solution 0.01 percent in water of these substances is faintly yellow, and a thin layer thereof markedly absorbs ultraviolet ray. For instance, when examined by a quartz spectrograph, a one centimeter layer of said solution strongly absorbs the ultraviolet rays and two centimeters thereof permits no trace of the ray to pass, while for the visible rays, most of them can freely pass the layer of the solution except that a partial absorption begins at the middle of G and H of Fraunhofer's lines and increasing in K to the ultraviolet region. The solution therefore can be applied for a liquid filter for short wave rays and especially of ultraviolet ray.

The following are examples of the application of the new products according to the invention to make filters.

(1) Ultrazin potassium or sodium is mixed with gelatine and by using such mixture a dry light filter is manufactured according to the ordinary method. When such filter contains one gramme of the salt per square meter, it strongly absorbs ultraviolet rays and when it contains two grammes of the salt per square meter, practically no trace of the rays passes through the filter.

(2) A yellow light filter, the so-called filter-yellow is recommended as the best material for use in orthochromatic photography, photochronomy, and colour photography, and it is said that, the material strongly absorbs ultraviolet ray. Comparing filters which are manufactured by using filter-yellow and those manufactured by using ultrazin under the conditions that they have equal tone of colour, that is, they absorb visible rays in equal degree, ultraviolet ray passes the former considerably while it can almost not pass the latter. Therefore, if ultrazin is used in place of filter-yellow, a far better result to shut out the ultraviolet ray is obtained.

(3) Tartrazin has a beautiful yellow colour and absorbs violet and blue rays and therefore it is used as yellow filter. But it is very ineffective for the absorption of ultraviolet ray, unless the filter contains tartrazin in a quantity over three grammes per square meter, and absorbs up to E lines. When it is used in less quantity than stated above, so that the filter absorbs some one of the waves between E, and H rays, the filter, in addition to the rays required, passes more or less of ultraviolet ray, and therefore required filtration of the light can not be realized. When, however, a filter is prepared by using for example, two grammes of tartrazin and one gramme of ultrazin sodium or potassium per square meter, ultraviolet ray can never pass therethrough. The effect of such filter is therefore far better than that of the filter prepared by using known yellow dye alone.

(4) When a filter is prepared by using rose bengale and tartrazin, a good filter for red ray is obtained. But this filter permits ultraviolet ray to pass, which is a defect of the filter. When, however, a small quantity of ultrazin salt is added, an ideal filter for red ray is obtained because it becomes perfectly proof for ultraviolet ray.

(5) Toluidin blue and the like permit the ultraviolet rays to pass and therefore a filter made by using such substances is not a perfect filter. When mixing such substances with ultrazin, a perfect blue filter is obtained.

This application is a division of our co-pending application Ser. No. 731,488 which has now matured into Patent No. 1,684,562 dated September 18, 1928.

Claim.

A light filter containing, as active material, a salt of the condensation product of a dextrose-containing sugar and phenylhydrazine parasulfonic acid.

In testimony whereof we hereunto affix our signatures.

TSUNEO SUZUKI.
SUEO SAKURAI.